July 5, 1932.   P. D. PAYNE ET AL   1,866,172
APPARATUS FOR USE IN THE PRODUCTION OF
STORAGE BATTERY ELECTRODE ELEMENTS
Original Filed June 4, 1926   2 Sheets-Sheet 1

Inventors
Paul D. Payne
and
Morton Iverson
by Henry Lanahan
Attorney

July 5, 1932.　　P. D. PAYNE ET AL　　1,866,172
APPARATUS FOR USE IN THE PRODUCTION OF
STORAGE BATTERY ELECTRODE ELEMENTS
Original Filed June 4, 1926　　2 Sheets-Sheet 2

Inventors
Paul D. Payne
and
Morton Iverson
by Henry Canahan
Attorney

Patented July 5, 1932

1,866,172

UNITED STATES PATENT OFFICE

PAUL D. PAYNE, OF IRVINGTON, NEW JERSEY, AND MORTON IVERSEN, OF BROOKLYN, NEW YORK, ASSIGNOR TO THOMAS A. EDISON, INCORPORATED, OF WEST ORANGE, NEW JERSEY, A CORPORATION OF NEW JERSEY

APPARATUS FOR USE IN THE PRODUCTION OF STORAGE BATTERY ELECTRODE ELEMENTS

Original application filed June 4, 1926, Serial No. 113,613. Divided and this application filed March 8, 1929.
Serial No. 345,571.

The present application is a division of our co-pending application Serial No. 113,613, filed June 4, 1926, and entitled Storage battery electrode elements and the production thereof.

Our invention relates to apparatus which while adapted for other uses, is particularly applicable for use in producing storage battery electrode elements especially those of the form and produced by the method described and claimed in our co-pending application referred to above.

The principal object of our invention is to provide improved apparatus of this character which is of simple construction and which is particularly effective in applying layers of finely divided active material or the like to suitable supports such as sheets formed of asbestos or other suitable insulating material.

Other objects and features of our invention will be hereinafter more fully described and claimed.

In order that our invention may be more clearly understood, attention is directed to the drawings accompanying and forming a part of this specification and in which.

Figure 1:
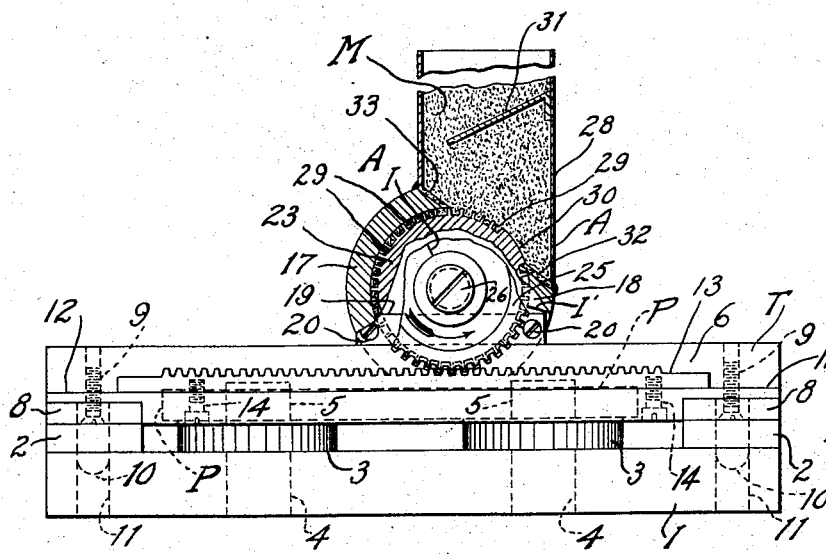
Figure 1 is a view in side elevation, partly in section, of a preferred form of apparatus embodying our invention which is especially adapted for applying layers of finely divided dry active material to insulating sheets or other supports.
Figure 2:
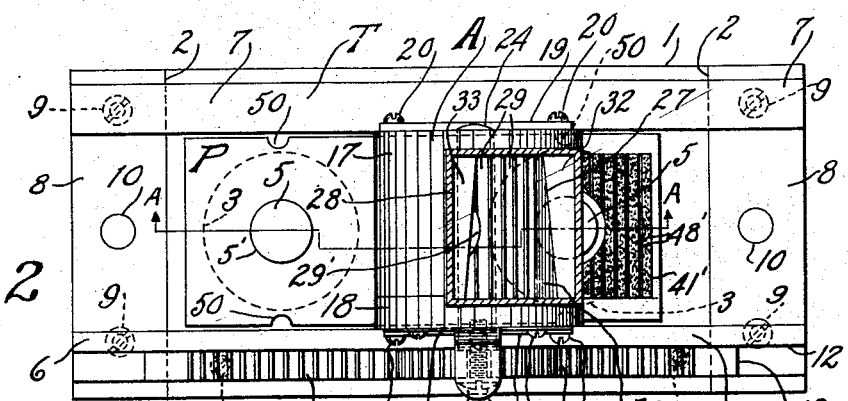
Fig. 2 is a plan view of the apparatus shown in Fig. 1.

Referring to the drawings, the apparatus for applying the active material to the insulating sheets or other supports comprises a rectangular base 1 provided with suitable means for supporting in a predetermined position a member to which the active material is to be applied, a track T removably mounted on the base 1, and a device A slidably and removably mounted on the track and comprising a hopper for the active material and means actuated in the sliding movement of said device on said track for feeding the active material from said hopper. Secured in any suitable manner to the base 1 at opposite ends of the latter are two transverse bars 2, and secured to the base between said bars and midway between the sides of the base are two cylindrical supports or spacing members 3 which are preferably slightly thicker than the bars 2. The spacing members 3 are secured to the base 1 by means of their reduced downwardly extending cylindrical portions 4, which have a driving fit in openings provided in the base. The spacing members 3 are also provided with reduced upwardly extending cylindrical portions 5 which are of the same size and the same distance apart as the openings provided for the poles in the insulating sheets of the electrode elements. The track T is in the form of a rectangular frame comprising two parallel side rails 6 and 7 rigidly secured together in proper spaced relation by two transverse bars 8 and screws 9 extending through said bars and threaded into the rails. The bars 8 are respectively disposed in recesses provided in the lower sides of the rails 6 and 7 at the ends thereof, the construction being such that the bars when secured to the rails by the screws 9, will be flush with the lower surfaces of the rails. Affixed to each of the bars 8 midway of the length thereof is a cylindrical pin 10. The pins 10 project downwardly from the bars 8, and when the track T is applied to the base 1 these pins respectively engage and fit closely within cylindrical openings 11 provided in and extending through the base 1 and the transverse bars 2, thereby serving to removably and firmly hold the track T in a predetermined position on the base. The rail 6 is provided at the outer side thereof for its entire length with a rectangular recess or cut-out portion 12, and a longitudinally extending rack 13 is disposed in said recess 12 and secured to the rail by screws 14.

Figure 3:
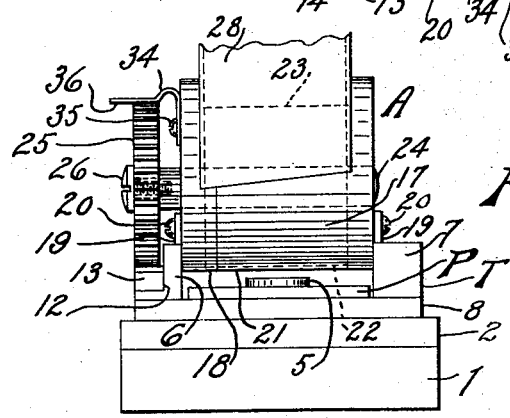
Fig. 3 is an end view in elevation, partly broken away, looking from the right in Figs. 1 and 2.

The device A comprises a substantially cylindrical hollow casing 17 one end of which is integrally formed with the main body portion thereof and the other end 18 of which is formed separately from the said body portion and is removably secured thereto. The casing 17 is of such width as to fit fairly closely between the rails 6 and 7, and is supported for sliding movement on said rails by means of two rectangular bars 19 respectively secured to the ends of the casing by screws 20. The casing 17 is cut away at the bottom to provide the same with a lower flat surface 21, the construction and arrangement being such that when the device A is positioned on the track with the bars 19 engaging the upper surfaces of the rails 6 and 7, as shown in Figs. 1 and 3, the casing 17 will extend down between the rails with the lower flat surface 21 thereof parallel to the base 1 and only a slight distance above the plane of the upper ends of the cylindrical extensions 5 of the members 3. The cylindrical chamber within the casing 17 is substantially of the same length as the width of the layers of active material to be applied to the insulating sheets or other supports in forming the electrode elements, and the casing for substantially the entire length of the said chamber, is provided with a discharge opening 22 intersecting the lower flat surface 21 thereof. The means for feeding material from the hopper of the device A comprises a cylindrical member or barrel 23 which fits closely within the chamber of the casing 17 and is rotatably mounted therein by being secured to shaft 24 which is journaled in the ends of the casing. The shaft 24 extends outwardly beyond the end wall 18 of the casing 17 and has a gear wheel 25 secured thereto by means of a screw 26. The gear wheel 25 is adapted to mesh with the teeth of the rack 13 in the sliding movement of the device A on the track T, to thereby effect rotary movement of the barrel 23 and cause the latter to remove active material from the hopper and discharge the same through the opening 22. The casing 17 in addition to having the lower cut-away portion providing the flat surface 21, also has an upper inclined cutaway portion intercepting the wall of the chamber in the casing to thereby provide an inlet opening 27 to said chamber for substantially its entire length. The hopper 28 of the device A, is substantially rectangular in shape and is suitably secured at its lower end to the casing 17 tightly about the edges of the said inclined cut-away portion, as shown, so that the hopper has communication with the chamber in the casing 17 through the inlet opening 27.

Figure 4:
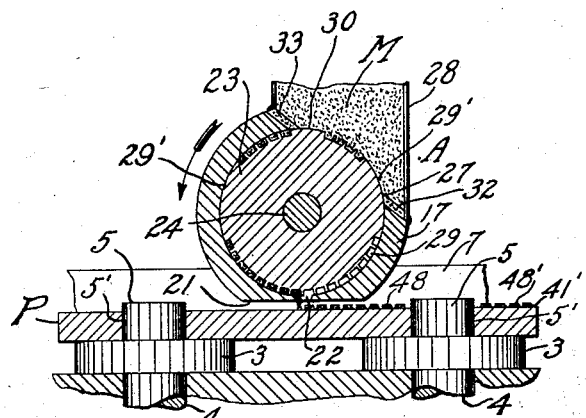
Figs. 4 and 5 are detailed sectional views taken on a line corresponding to the line A—A of Fig. 2, parts being shown in elevation, illustrating how the apparatus is used in applying a layer of active material to each side of an insulating sheet or support.
Figure 5:
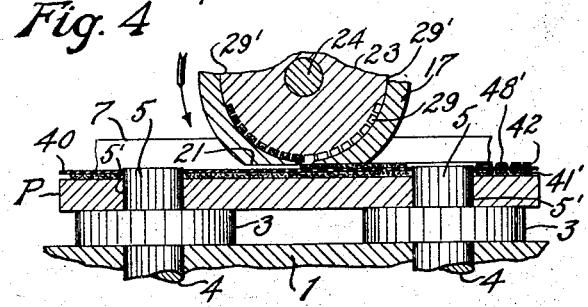

The cylindrical surface portion of the barrel 23 is provided with a series of similar closely adjacent parallel pockets 29 separated by thin walls or partitions, said pockets extending lengthwise of the barrel and parallel to the axis thereof. The series of pockets 29 corresponds in length and width to the layers of active material of the electrode elements to be produced, and the ends of such series are separated by an unrecessed cylindrical surface portion 30 of the barrel. A portion of the barrel 23 extends into the hopper 28 through the inlet opening 27 and accordingly all of the pockets 29 in such portion of the barrel will under the action of gravity, become filled with the very finely divided active material M with which the hopper is kept supplied, the said material being in a dry loose state and without any binder. The hopper 28 is provided with a transverse wall or partition 31, extending from the right-hand wall thereof and terminating short of the left-hand wall thereof, referring to Fig. 1, so as to divide the hopper into two communicating chambers. By this construction the operator is enabled to readily maintain a sufficient quantity of material in the hopper to provide a constant effective head of such material over that portion of the barrel 23 which projects into the hopper, for when the material falls to the level of the opening between the two communicating chambers provided by the partition 31, this gives an indication to the operator that additional material should be added. The inlet opening 27 in casing 17 is defined at its side edges by knife-edged flanges 32 and 33 provided at the lower end of the hopper 28. During the feeding of material from the hopper 28, the device A is moved on the track T from the right to the left, referring to Figs. 1, 2, 4 and 5, and in such movement the barrel 23 will be rotated, by reason of the engagement of the gear 25 with the rack 13, in the direction of the arrow shown in Figs. 1, 4 and 5. The flanges 32 and 33 at the lower end of the hopper 28 are arranged with the knife edges thereof very closely adjacent the surface of the barrel 23, and so that said knife edges extend at an angle to the pockets 29 whereby in the movement of said pockets past the knife edges each of said pockets will be gradually uncovered as it enters the hopper and gradually covered or cut off from communication with the hopper as it leaves the latter. In the rotation of the barrel 23 each of the pockets 29 will as it enters the hopper 28 past the knife edge of the flange 32, by reason of the gradual uncovering thereof and the constant effective head of finely divided active material M maintained thereabove, become completely and uniformly filled with such material; and as each of the pockets 29 is moved from the hopper 28 past the knife edge of the flange 33 said knife edge will act to scrape and shear off any small lumps or particles of active material and any portions of such lumps or particles projecting above the pocket. Because of the inclination of the cut-away portion of the casing 17 about which the hopper 28 is secured the effective head of the material M will be greatest over each pocket 29 at the point where it enters the hopper and accordingly each pocket upon entering the hopper, will become filled with a uniform and fairly compact mass of said material. Also by reason of the inclination of the knife edge of the flange 33 with respect to the pockets 29 and the fact that such knife edge is located substantially at the highest point in the path of travel of the surface portion of the barrel and the pockets therein, the shearing action of the knife edge on the particles of material is rendered more effective and the likelihood of any particles or lumps of active material becoming bound between the unrecessed surface portions of the barrel 23 and the flange 33 and the casing 17. is practically obviated. In order to further insure the complete and uniform filling of the pockets 29 in the barrel 23 and the complete discharge of material from the pockets. means is provided for agitating the contents of the hopper 28 to cause the material M to flow freely from the latter into the pockets and for vibrating the drum 23, during the movement of the device A on the rails 6 and 7 in effecting a deposition of a layer of active material on the insulating sheet or other support. As shown, this means comprises a resilient member 34 secured by screws 35 to the end wall 18 of casing 17 and provided adjacent its free end with a downward projection 36 disposed in the path of the teeth of gear 25. Upon rotation of the gear 25 it will be obvious that the teeth thereof will vibrate the resilient member 34 and that thereby vibrations will be imparted to the entire hopper device A.

The outer surface of the gear 25 is provided with a radial indicating mark I which is registered with a similar mark I' provided on the end 18 of casing 17 so as to set the barrel 23 in the proper angular position in casing 17, when the device A is positioned on the right hand end of track T, referring to Fig. 1, preparatory to moving said device along said track in applying a layer of finely divided active material to the presser plate or insulating sheet supported on the base 1, as hereinafter described.

Figures 6, 7, 8:
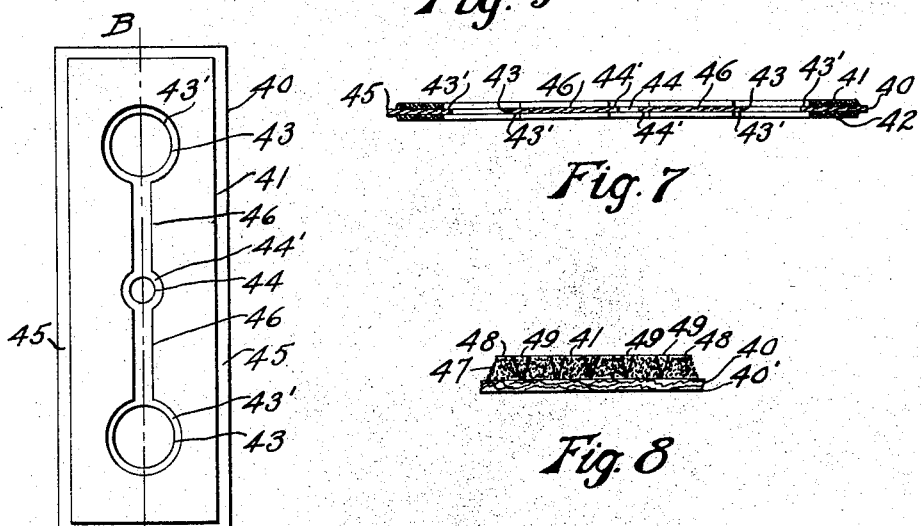
Fig. 6 is a plan view of an electrode element comprising an insulating sheet having a layer of active material applied to each side or surface thereof.
Fig. 7 is a sectional view on the line B—B of Fig. 6.
Fig. 8 is an enlarged detailed sectional view of an electrode element such as illustrated in Figs. 6 and 7 showing a portion of the insulating sheet and one layer of the active material applied thereto.

In Figs. 6 and 7 we have shown an electrode element adapted to be produced by the use of the apparatus above described. This electrode element consists of a rectangular insulating sheet 40 formed of asbestos or other suitable fibrous insulating material and having on one side a thin layer 41 of iron-containing material such as iron or oxide of iron, and on the other side a thin layer 42 of nickel hydroxide. Adjacent its ends and midway between its side edges the insulating sheet 40 is provided with circular openings 43 through which the poles of a battery pile extend when a plurality of the electrode elements are assembled into such a pile. The sheet 40 is also provided centrally thereof with a smaller circular opening 44, and when a plurality of elements such as described are assembled into a battery pile the central openings in the insulating sheets thereof provide a path for the circulation of electrolyte. To prevent the layers of active material on the insulating sheet 40 from shedding or being broken off at their edges and from coming into contact with the poles which are to extend through the openings 43, and in order to further facilitate the circulation of electrolyte, each surface of the said sheet is provided with uncovered portions carrying no active material, namely, the edge portions 45, and the channeling consisting of the annular portions 43' and 44' and the straight, narrow portions 46, 46 located midway of the edges of the sheet and extending between the said annular portions.

Each of the layers of active material of the element shown in Figs 6 and 7 consists of a continuous dense coherent channeled sheet of finely divided active material firmly adhering to the insulating sheet. Each such layer of material, however, comprises portions of different densities and, referring to Fig. 8, is preferably composed of a series of similar slightly spaced parallel sections 48 extending transversely of the insulating sheet 40, separated by sections 49, the sections 48 being compacted under pressure to such an extent as to be very dense and only slightly permeable by the electrolyte and the sections 49 being much less dense and much more readily permeable by the electrolyte. It will be apparent that the less dense sections 49 of each of the layers of active material in the elements described, or at least a majority of such sections, are intercepted by and therefore in direct communication with the channeling extending through such layer at the central portion thereof and consisting of the channels 46, 46 and the circular enlargements thereof provided by the annular, uncovered portions 43' and 44' of the insulating sheet, and that through such channeling the said sections 49 are also in communication with the central opening 44 of the insulating sheet. These sections 49 form paths whereby the electrolyte may more readily reach all portions of the layers of active material, and they cooperate with the openings 44 in the insulating sheets and the channeling extending through the layers of active material to further facilitate and increase the circulation of electrolyte through an assembled battery pile. The active material is applied to the insulating sheet of an element such as shown in Figs. 6 and 7, so that the channelings in the two layers of such material and the corresponding sections of such layers are in alignment.

The surface portion of the barrel 23 having the closely adjacent parallel pockets 29 therein is provided with a central solid or unrecessed section 29' corresponding in shape to the channeling and the circular enlargements of such channeling with which each layer of an electrode element, such as shown and described herein, is provided. The purpose of such solid or unrecessed portion 29, as will be obvious, is to block out and prevent the deposition of active material on a portion of the support or insulating sheet to which a layer of active material is applied in the operation of the device A, corresponding with the channeling in each layer of active material of the completed element.

In producing an element such as shown in Figs. 6 and 7, we proceed as follows: A flat rectangular presser plate P of the same length as the insulating sheet 40 but slightly wider than the latter, is mounted on the spacing members or supports 3 carried by the base 1, with the circular openings 5' provided therein adjacent its ends engaged by the reduced cylindrical extensions 5 of the members 3. The gear 25 of the device A is turned to a position in which the indicating mark I thereon registers with the indicating mark I' on the end 18 of the casing 17 so as to properly position the barrel 23 within the latter. The device A with the hopper 28 full of the dry loose finely divided active material to be deposited, for example, finely divided iron or oxide of iron, is then mounted, referring to Figs. 1, 2, 4 and 5, on the right hand end of track T just beyond the adjacent end of the rack 13 and is moved to the left so as to traverse the presser plate P for its entire length. In this movement of the device A a layer 41' of finely divided iron is deposited from the pockets 29 of the barrel 23 through the discharge opening 22 onto the upper surface of the presser plate P, such layer being of the same extent and configuration as the layer 41 of the finished element except that it is made up of a series of transversely extending slightly spaced parallel and uniform sections 48' of loose finely divided active material. The device A is now removed from the track T, the insulating sheet 40 is placed on the layer 41' with the extensions 5 of the spacing members 3 engaging the openings 43 in said sheet, and a device identical with the device A, but having its hopper filled with finely divided nickel hydroxide in a dry loose state and free from any binder, is mounted on the right hand end of the track T with the feeding barrel thereof turned to the proper angular position, and this device is then moved on the track towards the left to traverse the sheet 40 and deposit thereon a layer 42' of active material. The layer 42' is identical with the layer 41' deposited on the presser plate P, except that it is formed of a series of slightly spaced parallel sections of finely divided nickel hydroxide. The track T and the depositing or hopper device mounted thereon are then removed from the base 1. A second presser plate similar to the presser plate P, is then placed on the layer 42' of active material. The fixture consisting of the two presser plates with the two layers 41' and 42' of active material and the interposed insulating sheet 40 disposed therein, is then removed from the base 1 and subjected to an enormous pressure, preferably a pressure of from two to ten tons per square inch, in a hydraulic press. Under this pressure each of the layers 41' and 42' of dry loose finely divided active material is compacted and the sections 48' thereof are spread out and merged so as to form a continuous dense coherent sheet or layer of uniform thickness with a smooth flat surface. Each such sheet, however, will, as indicated in Fig. 8, consist of a series of slightly spaced very dense parallel sections 48, corresponding to the sections 48' deposited on the presser plate P and insulating sheet 40 from the hopper devices, and relatively narrow intermediate parallel sections 49 of much less density which are formed by the merging of the edge portions of the adjacent sections 48' under the pressure to which the latter were subjected in the fixture consisting of the two presser plates.

It is to be distinctly understood that the apparatus specifically described herein is subject to various changes and modifications without departure from the spirit of our invention and the scope of the appended claims.

Having now fully described our invention, what we claim as new and desire to protect by Letters Patent is as follows:

1. In apparatus of the character described, a base having supporting means for a member to be coated, a device mounted on said base for sliding movement in a path traversing said supporting means, said device comprising a hopper, a casing having an inlet opening communicating with said hopper and a discharge opening, and a rotatable pocketed barrel disposed in said casing for removing material from said hopper and discharging it through said discharge opening, and means for effecting rotation of said barrel upon sliding movement of the said device on said base, substantially as described.

2. In apparatus of the character described, a base having supporting means for a member to be coated, a device mounted on said base for sliding movement in a path traversing said supporting means, said device comprising a hopper, a casing having an inlet opening communicating with said hopper and a discharge opening, and a rotatable pocketed barrel disposed in said casing for removing material from said hopper and discharging it through said discharge opening, means for effecting rotation of said barrel upon sliding movement of the said device on said base, and means for vibrating said barrel upon the rotation thereof, substantially as described.

3. In apparatus of the character described, a base having supporting means for a member to be coated, a device mounted on said base for sliding movement in a path traversing said supporting means, said device comprising a hopper, a casing having an inlet opening communicating with said hopper and a discharge opening, and a rotatable pocketed barrel disposed in said casing for removing material from said hopper and discharging it through said discharge opening, means for effecting rotation of said barrel upon sliding movement of the said device on said base, and means for vibrating said barrel and agitating the contents of said hopper upon the rotation of the barrel, substantially as described.

4. In apparatus of the character described, a device comprising a casing having an inlet opening and a discharge opening, a pocketed rotatable barrel mounted and fitting closely within said casing, and a hopper connected with said casing about said inlet opening, said hopper having a transverse partition extending from one wall thereof and terminating short of its opposite wall, said partition being located directly over that portion of the barrel which extends into the hopper through said inlet opening, substantially as described.

5. In apparatus of the character described, a device comprising a cylindrical casing having an upper inlet opening and a lower discharge opening, a rotatable barrel mounted and fitting closely within said casing, and a hopper connected with said casing about said inlet opening, the surface portion of said barrel being provided with a plurality of pockets extending longitudinally of the barrel, said device having a knife-edged portion disposed closely adjacent the surface of said barrel, the knife edge of said portion defining one edge of said inlet opening and extending at an angle to the pockets in the barrel, substantially as described.

6. In apparatus of the character described, a device comprising a cylindrical casing having an upper inlet opening and a lower discharge opening, a rotatable barrel mounted and fitting closely within said casing, and a hopper connected with said casing about said inlet opening, the surface portion of said barrel being provided with a plurality of pockets extending longitudinally of the barrel, said device having a knife-edged portion disposed closely adjacent said barrel at substantially the highest point in the path of movement of the surface thereof, the knife edge of said portion defining one edge of said inlet opening and extending at an angle to the pockets in the barrel, substantially as described.

7. In apparatus of the character described, a device comprising a cylindrical casing having an upper inlet opening and a lower discharge opening, a rotatable barrel mounted and fitting closely within said casing, and a hopper connected with said casing about said inlet opening, the surface portion of said barrel being provided with a plurality of pockets extending longitudinally of the barrel, said device having spaced knife-edged portions disposed closely adjacent said barrel, the knife edges of said portions respectively defining opposite edges of said inlet opening and extending at an angle to the pockets in the barrel, substantially as described.

8. In apparatus of the character described, a device comprising a cylindrical casing having inlet and discharge openings, a rotatable barrel mounted and fitting closely within said casing, and a hopper communicating with said casing through said inlet opening, the surface portion of said barrel being provided with a series of spaced pockets and with an uninterrupted or unrecessed section intercepting a plurality of said pockets, substantially as described.

9. In apparatus of the character described, a support for a member to be coated, a device mounted on said support for sliding movement, said device comprising a hopper, a casing having an inlet opening communicating with said hopper and a discharge opening, and rotatable feeding means disposed in said casing for removing material from said hopper and discharging it through said discharge opening, means for effecting rotation of said feeding means upon sliding movement of the said device on said support, and means for agitating the contents of said hopper upon the rotation of the feeding means.

10. Apparatus of the character described, comprising a hopper having a discharge opening, means for feeding material from the hopper comprising a rotatable barrel mounted so that the lateral surface thereof is contiguous the edges of said opening and only a portion of said surface is at any time exposed to the interior of said hopper, the lateral surface portion of the barrel being provided with one or more longitudinally extending pockets, and a knife-edged portion disposed closely adjacent the lateral surface of the barrel with its knife edge defining one edge of said discharge opening and extending at an angle to the pocket or pockets in the barrel.

11. Apparatus of the character described, comprising a hopper, a casing having an inlet opening communicating with said hopper, a rotatable barrel mounted in said casing and fitting closely about said inlet opening, the lateral surface portion of said barrel being provided with one or more longitudinally extending pockets, and a knife-edged portion disposed closely adjacent the lateral surface of the barrel with its knife edge defining one edge of said opening and extending at an angle to the pocket or pockets in the barrel.

This specification signed this 7th day of March, 1929.

PAUL D. PAYNE.
MORTON IVERSEN.